(12) United States Patent
Chang et al.

(10) Patent No.: US 9,979,774 B2
(45) Date of Patent: May 22, 2018

(54) DEBUGGING AND FORMATTING FEEDS FOR PRESENTATION BASED ON ELEMENTS AND CONTENT ITEMS

(71) Applicant: Flipboard, Inc., Palo Alto, CA (US)

(72) Inventors: Diane Chang, San Francisco, CA (US); Victor V. Greenwich, Palo Alto, CA (US); Chaitanya Laxminarayan, San Carlos, CA (US)

(73) Assignee: Flipboard, Inc., Palo Alto, CA (US)

( * ) Notice: Subject to any disclaimer, the term of this patent is extended or adjusted under 35 U.S.C. 154(b) by 375 days.

(21) Appl. No.: 14/494,573

(22) Filed: Sep. 23, 2014

(65) Prior Publication Data

US 2016/0085730 A1 Mar. 24, 2016

(51) Int. Cl.
*G06F 17/00* (2006.01)
*H04L 29/08* (2006.01)
*G06F 17/30* (2006.01)
*G06F 17/24* (2006.01)

(52) U.S. Cl.
CPC .............. *H04L 67/02* (2013.01); *G06F 17/24* (2013.01); *G06F 17/30056* (2013.01)

(58) Field of Classification Search
CPC . G06F 17/211; G06F 17/212; G06F 17/30056
See application file for complete search history.

(56) References Cited

U.S. PATENT DOCUMENTS

| | | | |
|---|---|---|---|
| 7,316,009 B2* | 1/2008 | Peck | G06F 11/3648 714/E11.207 |
| 7,620,840 B2* | 11/2009 | Tu | G06F 11/364 714/2 |
| 2005/0034102 A1* | 2/2005 | Peck | G06F 11/3648 717/124 |
| 2005/0080684 A1* | 4/2005 | Blum | G06Q 30/06 705/26.8 |
| 2006/0129973 A1* | 6/2006 | Newcorn | G06F 17/211 717/106 |
| 2007/0106694 A1* | 5/2007 | Mori | G06F 17/30011 |
| 2008/0120670 A1* | 5/2008 | Easton | H04N 7/173 725/115 |
| 2008/0162757 A1* | 7/2008 | Tu | G06F 11/364 710/107 |
| 2009/0077098 A1* | 3/2009 | Leino | G06F 17/30905 |
| 2011/0099071 A1* | 4/2011 | Johnson | G06Q 30/02 705/14.64 |
| 2011/0283239 A1* | 11/2011 | Krishnan | G06F 11/3636 715/853 |

(Continued)

*Primary Examiner* — Stephen Hong
*Assistant Examiner* — Gregory Vaughn
(74) *Attorney, Agent, or Firm* — Fenwick & West LLP

(57) ABSTRACT

A digital magazine server receives feeds of content items from various sources and formats content items from the feed for presentation in a digital magazine. The digital magazine server determines whether the content items from the feed satisfy one or more rules specifying presentation of content items by the digital magazine server. Content items from a feed are compared to the one or more rules to generate results specifying whether various content items satisfy one or more of the rules. To simplify review of the content items, results are grouped for each content item to allow the source of the feed to individually edit the content items to comply with the one or more rules.

21 Claims, 4 Drawing Sheets

(56) References Cited

U.S. PATENT DOCUMENTS

2012/0144240 A1* 6/2012 Rentschler .......... G06F 11/3636
714/34
2014/0033183 A1* 1/2014 Brown ................ G06F 11/3636
717/131

* cited by examiner

DEBUGGING AND FORMATTING FEEDS FOR PRESENTATION BASED ON ELEMENTS AND CONTENT ITEMS

BACKGROUND

This invention relates generally to digital magazines, and more specifically to validating content feeds against rules applied to content items by a digital magazine.

Users often interact with content items provided by various sources, such as social networking systems, online publishers, and blogs. Rather than individually accessing each source to interact with content items from different sources, a user may configure a digital magazine including content items from multiple sources. A digital magazine server maintains information describing the digital magazine and retrieves content items from sources identified by the user. The digital magazine server determines a format for presenting the retrieved content items and communicates the content items along with instructions describing the format for presenting the content items to a client device for presentation to the user.

However, different sources often provide content items to the digital magazine server in different formats. A content item includes different portions, and various sources may use different formats for presenting portions of a content item. To provide the digital magazine server with content suitably formatted for presentation in the digital magazine, sources often have to compare various portions of each content item to formatting rules or formatting constraints applied by the digital magazine server, which is time intensive.

SUMMARY

A digital magazine server receives content items from various sources and generates a digital magazine including content items selected from the received content items for presentation to a user. The digital magazine server determines a format in which the selected content items are presented relative to each other that simplifies the user's access to and interaction with the selected content items. Additionally, the digital magazine server may organize the selected content items into various sections, with each section including content items having one or more common characteristics (e.g., a common source, a common author, a common topic, a common date, etc.).

The digital magazine server receives a source address of a feed including multiple content items from a source. For example, the source address is a uniform resource locator (URL), another type of network address, or identifier of the feed. At least one content item is included in the feed associated with the source address, with content items included in the feed retrieved by accessing the source address. Based on the source address, the digital magazine server receives one or more content items from the feed. However, one or more content items included in the feed may be in a format that is incompatible with the digital magazine server. For example, the format of content items from the feed may be incompatible with rules or formatting constraints used by the digital magazine server to display content. Each content item in the feed includes one or more elements, which are components of the content item. Example elements of a content item include: text data, image data, video data, audio data, or other suitable data. Formatting information is associated with an element of a content item describing presentation of the element.

One or more rules are applied to a content item from the feed by the digital magazine server. A rule specifies one or more criteria for formatting of an element of the content item, allowing the digital magazine server to specify the format in which various elements of the content item are presented when presented by the digital magazine server. Example rules specifying criteria for presenting text elements may specify font, font size, font color, letter spacing, placement of text relative to other elements of a content item, or other suitable criteria for the digital magazine server displaying text elements. Example rules specifying criteria for presenting image or video elements may specify a location of image or video elements relative to other elements of the content item, options for a user to interact with image or video data, resolution of the image or video data, and size of the image or video data. Similarly, example rules specifying criteria for presenting audio elements specify volume with which audio data is presented and conditions for playing audio data.

Results are generated by the digital magazine server describing application of various rules to one or more elements of a content item from the feed of content items. For example, a result is a binary value with a value indicating the element satisfies criteria specified by a rule and an alternative value indicating the element does not satisfy criteria satisfied by the rule. If a value of a result from applying a rule to an element of the content item indicates the element does not satisfy criteria specified by the rule, the result may also identify one or more recommended modifications to the element to satisfy the criteria specified by the rule. In various embodiments, a result may include a preview of presentation of the content item using the recommended modifications to the element.

The digital magazine server generates groups of the results, with each group including results from applying a rule to one or more elements of a content item from the feed. Thus, each group is associated with a rule. In some embodiments, a group may include results from application of a rule associated with the group to elements form multiple content items in the feed. The groups of results are then presented to the source of the source address. For example, the groups of results are presented to a user associated with the source, allowing the user to modify elements of one or more content items in the feed to satisfy rules for formatting enforced by the digital magazine server.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
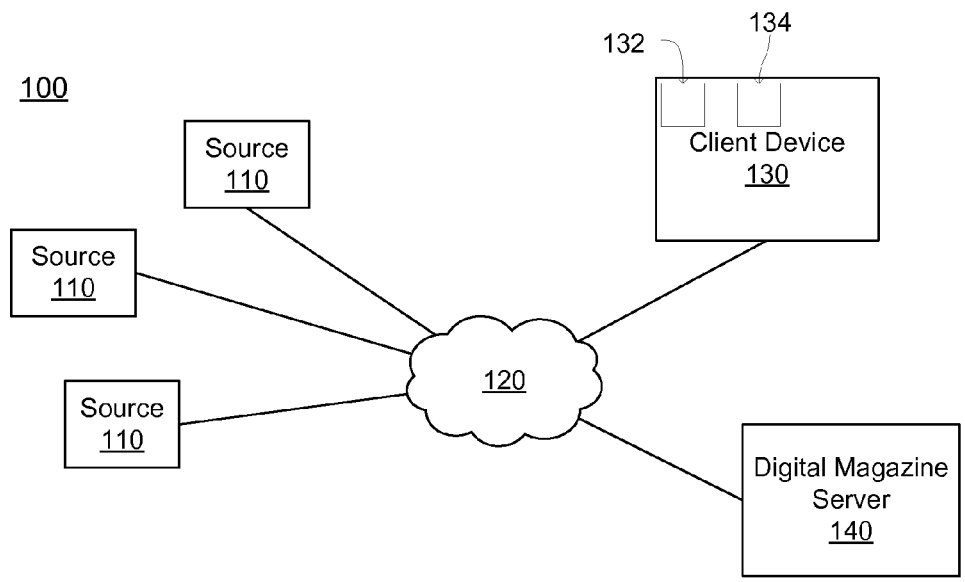
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
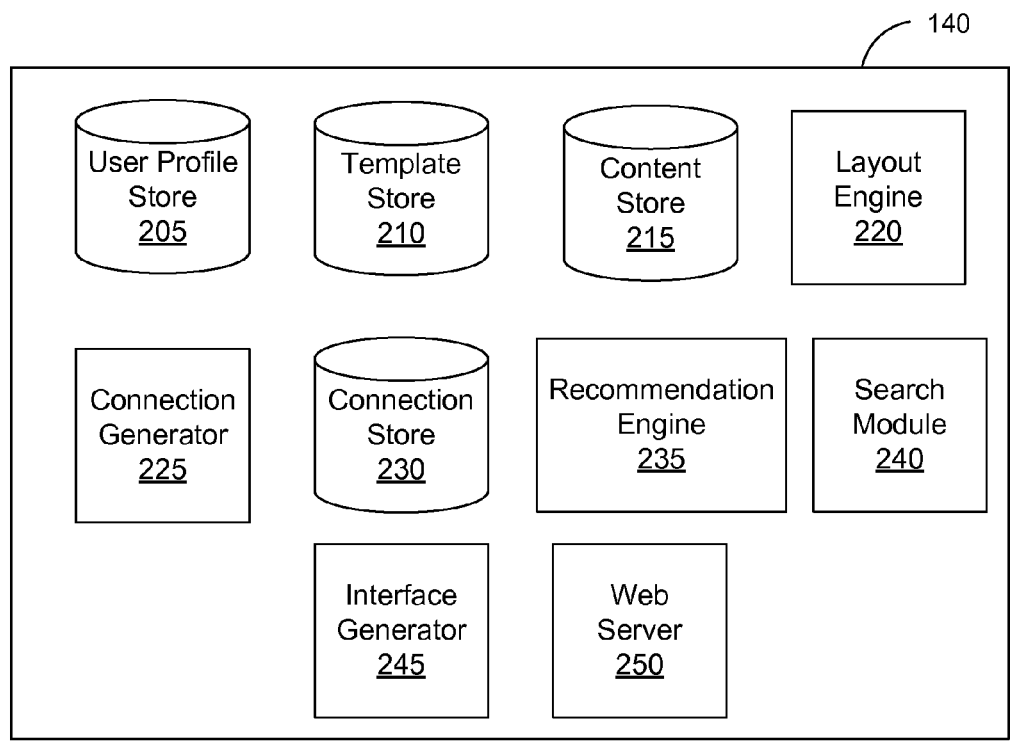
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represents various types of content. For example, the content store 215 stores content items received from one or more sources 215 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section. As further described below in conjunction with FIG. 4, a content item includes one or more elements, which are components of the content item. Example elements of a content item include: text data, image data, video data, audio data, or other suitable data. Additionally, formatting information may be associated with an element of a content item by a source 110 from which the content item was received to describe presentation of the element.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187, 840, filed on Jul. 21, 2011, which is hereby incorporated by reference in its entirety.

In some embodiments, the layout engine 220 retrieves content items from the content store 210 or from a source 110 and determines whether the content items satisfy one or more rules maintained by the digital magazine server 140 for presentation of content. The rules are included in the layout engine 220, with each rule identifying one or more criteria for formatting of an element of the content item. Example rules specifying criteria for presenting text elements may specify font, font size, font color, letter spacing, placement of text relative to other elements of a content item, or other suitable criteria for the digital magazine server displaying text elements. Example rules specifying criteria for presenting image or video elements may specify a location of image or video elements relative to other elements of the content item, options for a user to interact with image or video data, resolution of the image or video data, and size of the image or video data. Similarly, example rules specifying criteria for presenting audio elements specify volume with which audio data is presented and conditions for playing audio data. Information describing results of application of the one or more rules to content items from the source 110 is communicated from the layout engine 220 to the source 110, allowing the source 110 to readily identify elements of one or more content items that do not satisfy rules for formatting of content included in a digital magazine. As further described below in conjunction with FIGS. 4 and 5, the layout engine 220 may retrieve one or more templates from the template store 210 and use the one or more template to present the results to the source 110.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine or content items presented in windows in a feed validation service user interface. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140 or the user interface for the feed validation service.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, an application associated with the digital magazine server 140 receives a source address from a source for a feed, retrieves content items from the source address, and selects elements of the content items. The application applies one or more rules describing criteria for formatting of the content items for presentation in a digital magazine and presents results from application of the rules to a user (e.g., an operator of a source 110 from which the content items were retrieved). Based on the results, the user may reformat the content items to satisfy criteria specified by the one or more rules.

Page Templates

Figure 3:
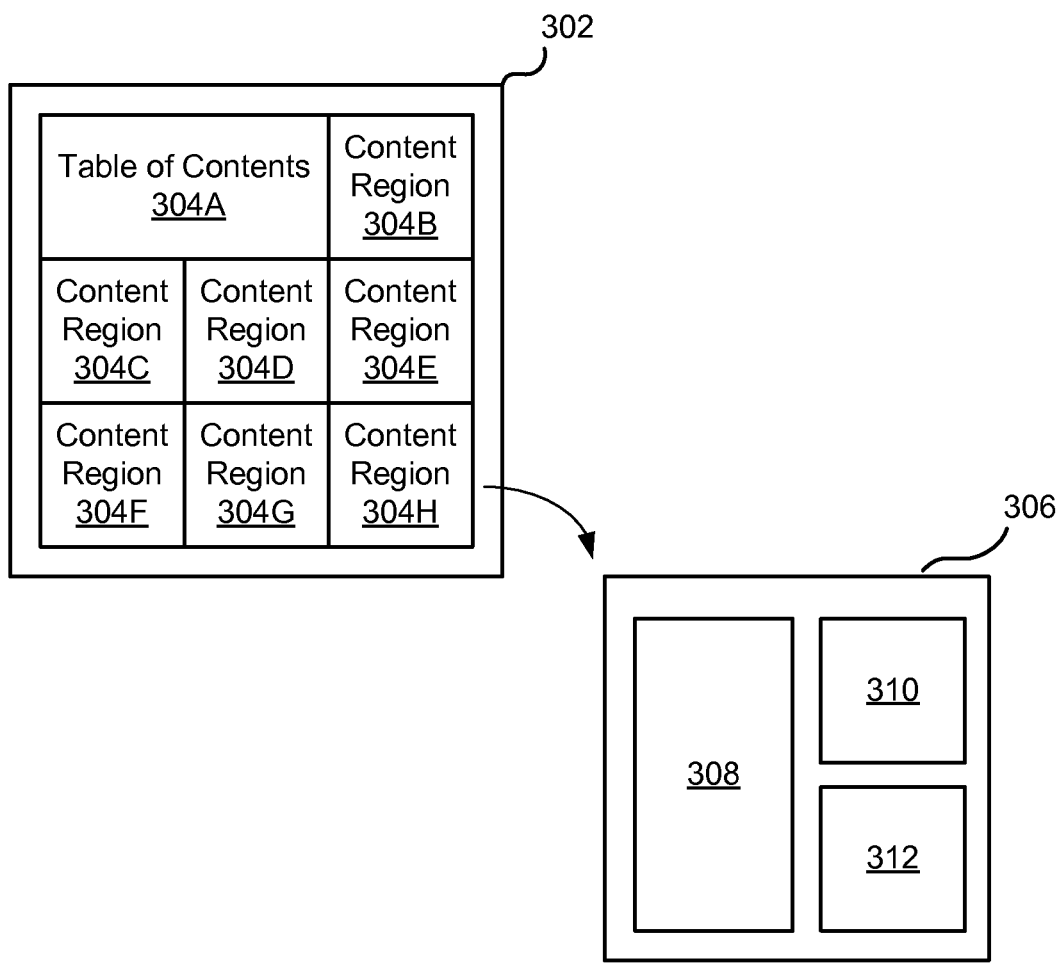
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Debugging Feeds for Presentation Based on Elements and Content Items

Figure 4:
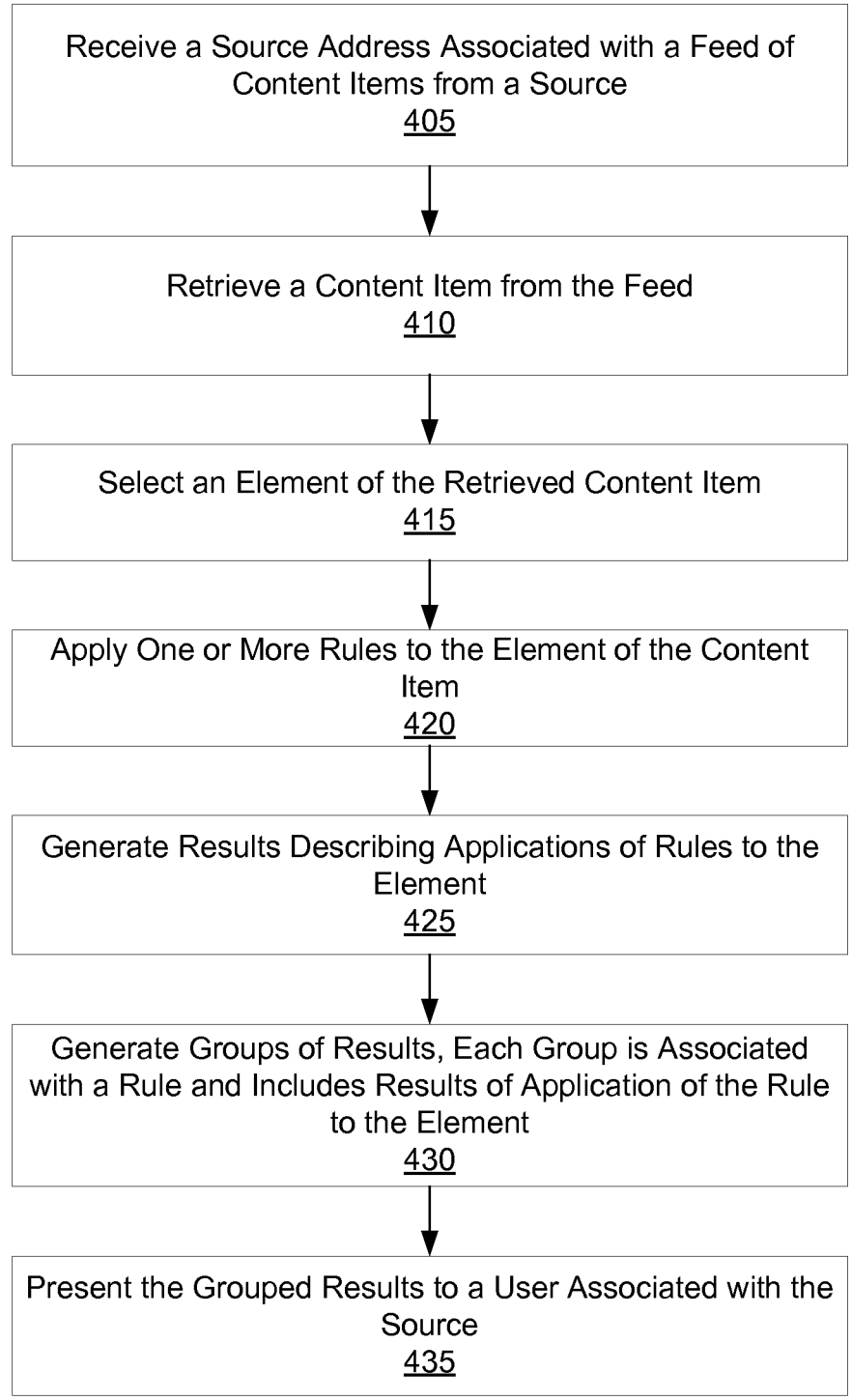
FIG. 4 is a flowchart of a method for validating formatting of content items based on formatting rules maintained by a digital magazine server, in accordance with an embodiment of the invention.

FIG. 4 is a flowchart of one embodiment of a method for debugging feeds based on elements in content items and content items. In other embodiments, the method may include different and/or additional steps than those shown in FIG. 4. The functionality described in conjunction with the digital magazine server 140 or online system in FIG. 4 may be provided by the layout engine 220 in one embodiment or may be provided by any other suitable component, or components, in other embodiments. Alternatively, the client device 130 executes one or more instructions associated with the digital magazine server 140, such as an application associated with the online system, to provide the functionality described in conjunction with FIG. 4.

The digital magazine server 140 receives 405 a source address associated with a feed of content items from a source. For example, the source address is a uniform resource locator (URL) or other network address from which content items in the feed are received 405. However, the source address may be any other suitable identifier of the feed or identifier of a location from a source 110 where the feed is maintained. As described above, the source 110 may be any provider of content, such as a news website, a social networking system, a blog, or any other entity maintaining a feed including content items for presentation to users. The feed includes one or more content items. In some embodiments, the digital magazine server 140 stores the received source address and an association between the source address and one or more users to receive content items from the feed associated with the source address.

Using the source address, the digital magazine server 140 retrieves 410 a content item from the feed. For example, the digital magazine server 140 accesses a source 110 and retrieves 410 the content item from the feed identified by a location associated with the source 110 and specified by the source address. In some embodiments, the content item is retrieved 410 without information identifying the feed including the content item. Alternatively, the content item and information identifying the feed including the content item (e.g., a feed name, a feed identifier, other content items in the feed) are retrieved 410. Additionally, the retrieved content item, or information describing the retrieved content item, may be stored by the digital magazine server 140.

The retrieved content item includes one or more elements. As described above in conjunction with FIG. 2, each element is a portion of the content item, such as data from the content item presented to a user. Formatting information is associated with each element by the source 110, with the formatting information describing characteristics of how an element is presented when the content item is presented. However, formatting information associated with one or more elements of the content item by the source 110 may not satisfy one or more criteria applied by the digital magazine server 140 for presenting content items. For example, formatting information associated with an element of the content item by the source 110 would result in the digital magazine server 140 displaying the content item in an undesirable format based on display formatting used by the digital magazine server 140. The digital magazine server 140 includes one or more rules each specifying criteria for formatting of the content items for presentation of one or more elements of a content item when presented by the digital magazine server 140.

To determine whether the content item satisfies criteria for presenting content, the digital magazine server 140 selects 415 an element of the content item and applies 420 one or more rules maintained by the digital magazine server 140 to an element of the content item. A rule specifies one or more criteria for formatting of an element. Different rules specify different criteria for the digital magazine server 140 to present an element of a content item, so applying 420 a rule to an element of a content item determines whether formatting information associated with the element by the source 110 satisfies criteria for presenting the element maintained by the digital magazine server 140. Example rules specifying criteria for presenting text elements may specify font, font size, font color, letter spacing, placement of text relative to other elements of a content item, or other suitable criteria for the digital magazine server 140 displaying text elements. Additionally, example rules specifying criteria for presenting image or video elements may specify a location of image or video elements relative to other elements of the content item, options for a user to interact with image or video data, resolution of the image or video data, and size of the image or video data. Similarly, example rules specifying criteria for presenting audio elements specify volume with which audio data is presented and conditions for playing audio data. Hence, a rule identifies a format used to present an element of a content item by the digital magazine server 140.

Results describing application of one or more rules to the element are generated 425. For example, a result is a binary value with a value indicating the element satisfies criteria specified by a rule and an alternative value indicating the element does not satisfy criteria satisfied by the rule. In one embodiment, the element is determined to satisfy criteria specified by a rule if formatting information associated with the element by the source 110 matches a format described by criteria specified by the rule or matches at least one of a set of alternative formats specified by the criteria included in the rule. If a value of a result from applying a rule to an element of the content item indicates the element does not satisfy criteria specified by the rule, the result may also identify one or more recommended modifications to the element to satisfy the criteria specified by the rule. For example, a result identifies one or more formats specified by criteria of the rule. In various embodiments, a result may include a preview of presentation of the content item using the recommended modifications to the element. For example, a result presents the element in a format specified by the criteria of the rule. In some embodiments, the result includes instructions for modifying the formatting information associated with an element to satisfy the criteria specified by the rule to simplify modification of the formatting information. The results are presented to a user associated with the source 110 from which the content item was retrieved 410. Presentation of the results is further described below in conjunction with FIG. 5. Additionally, the digital magazine server 140 may store the results for subsequent retrieval.

The digital magazine server 140 generates 430 groups of results. Each group is associated with a rule and includes results of application of the rule to the element. The digital magazine server 140 presents 435 the grouped results to a user associated with the source 110. If multiple content items are retrieved 410 from the source address, the rules are applied 420 to elements from a plurality of the content items, which generates 425 results describing application of one or more rules to one or more elements from the plurality of content items. When multiple content items are retrieved 410, a group associated with a rule includes results from application of the rule to elements from a plurality of content items including an element associated with the rule. Additionally, a group associated with a rule may include information for modifying one or more elements associated with results in the group indicating the one or more elements did not satisfy criteria included in the rule. The information for modifying the one or more elements may be recommendations for modifying formatting information associated with the one or more elements that did not satisfy criteria included in the rule or may be instructions that, when executed, modify the formatting information associated with one or more elements determined not to satisfy criteria included in the rule. If a user selects an instruction for modifying the formatting information, the digital magazine server 140 may modify the formatting information associated with an element of a content item or of multiple content items and communicate the modified formatting information to the source 110; alternatively, the digital magazine server 140 communicates the instruction to modify the formatting information to the source along with information identifying one or more content items to which the instruction is applied. This allows a user associated with the source 110 from which the content items were retrieved 410 to more easily modify formatting information associated with elements of multiple content items to satisfy the rule. An example presentation of groups of results from application of rules maintained by the digital magazine server 140 to a user associated with a source 110 is further described below in conjunction with FIG. 5.

Figure 5:
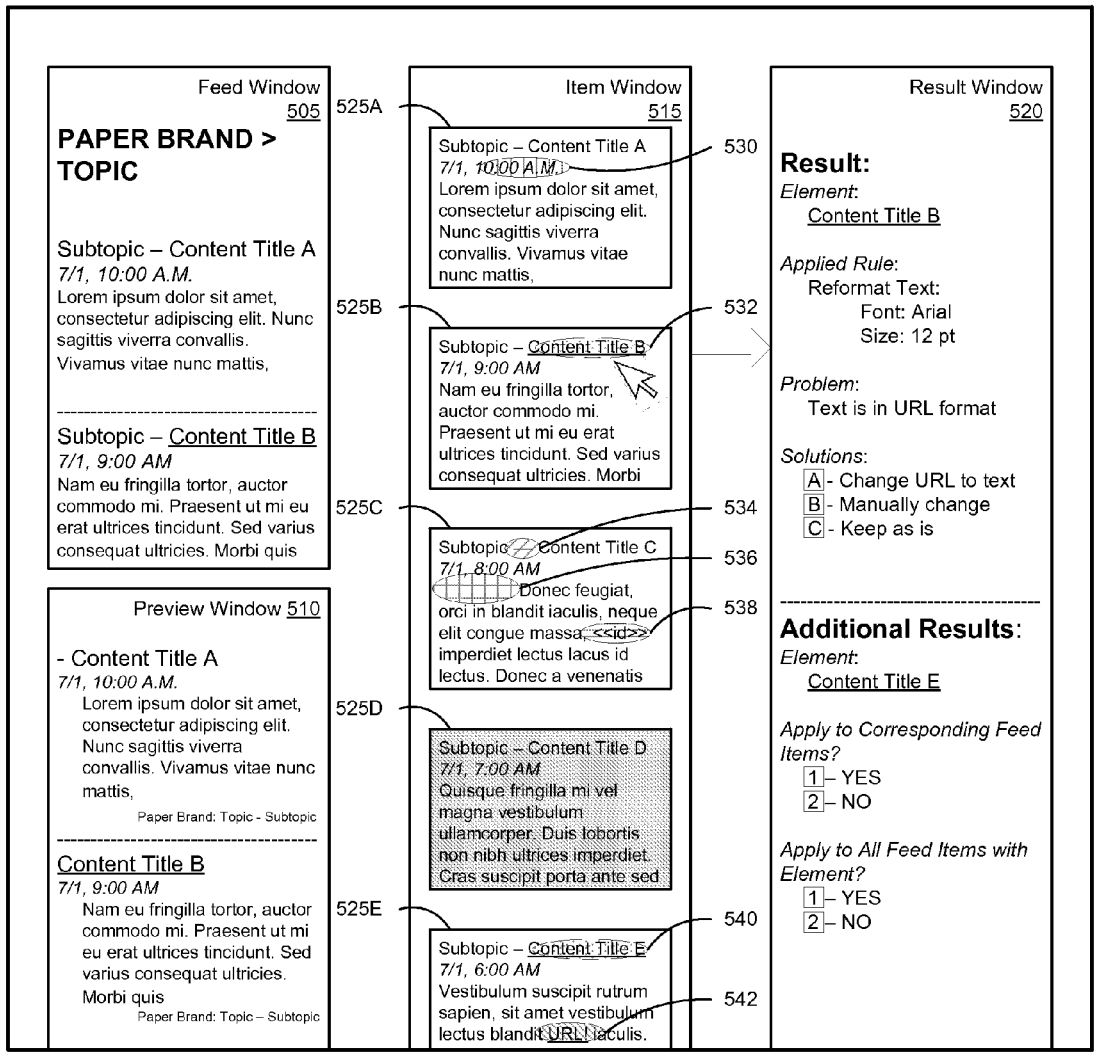
FIG. 5 illustrates an embodiment of a user interface for validating a content feed based on formatting rules, in accordance with an embodiment of the invention.

Presentation of Results of Application of Rules for Presentation to Content Items FIG. 5 illustrates an embodiment of a user interface 500 presented by the digital magazine server 140 describing results from application of rules for formatting content items presented by the digital magazine server 140. The user interface 500 shown in FIG. 5 includes a feed window 505, a preview window 510, an item window 515, and a result window 520. However, other embodiments of the user interface 550 may include different and/or additional components than those described in conjunction with FIG. 5.

The feed window 505 presents a feed of content items retrieved from a source address specified by a source 110. This allows the user interface 500 to present content items in the feed using formatting information associated with elements of content items by the source 100. For example, the feed window 505 presents a web page retrieved from the source address including the content items in the feed.

The item window 515 presents individual content items 525A-E (also referred to individually and collectively using reference number 525) from the feed. In one embodiment, the item window 515 includes individual content items 525A-E determined from parsing the feed using any suitable criteria. Each content item 525 shown in the item window 515 includes one or more elements. FIG. 5 shows element 530 of content item 525A, element 532 of content item 525B, elements 534, 536, 538 of content item 525C, and elements 540, 542 of content item 525E. In the example shown by FIG. 5, the item window 515 visually distinguishes elements associated with formatting information that do not satisfy one or more rules applied by the digital magazine server 140. For purposes of illustration, elements 532, 534, 536, 538, 540, and 542 in the example of FIG. 5 are associated with formatting information that does not satisfy criteria specified by one or more rules maintained by the digital magazine server 140.

A user associated with the source 110 may select one or more elements 532, 534, 536, 538, 540, and 542 indicated in the item window 515 as associated with formatting information that does not satisfy criteria specified by one or more rules to view additional information about the formatting information that does not satisfy criteria specified by a rule. The user may also select an alternative element associated with formatting information satisfying criteria specified by one or more rules to view information describing the one or more rules or other information describing application of the one or more rules to the alternative element. When an element is selected, results from application of one or more rules to the element are presented in the result window 520.

In the example of FIG. 5, element 532 was selected, so the result window 520 presents results of application of one or more rules to element 532. A result presented in the result window 520 identifies the selected element and describes the criteria specified by a rule applied to the selected element. If the selected element has formatting information that does not satisfy the criteria, the result also identifies one or more reasons the formatting information des not satisfy the criteria and may specify one or more recommendations for modifying formatting information associated with the element to satisfy the criteria specified by the rule. For example, the result includes instructions that, when executed, modify the formatting information associated with selected element to satisfy criteria associated with the rule. In some embodiments, an instruction to modify the formatting information associated with multiple elements that do not satisfy criteria specified by the rule is presented, allowing formatting information associated with each of the elements to be modified to satisfy the criteria specified by the rule by selecting the instruction.

In some embodiments, such as the example shown in FIG. 5, the user interface 500 also presents a preview window 510 presenting one or more content items using formatting information satisfying criteria specified by one or more rules applied to the one or more content items. This allows the preview window 510 to present a content item based on formatting information used by the digital magazine server 140 to present the content item. The content of the preview window 510 may be updated as a user selects one or more instructions from the result window 520 to modify formatting information associated with a content item, allowing a user to view the content item presented via the modified formatting information before storing the modified formatting information on the source 110.

Additionally, the user interface 500 may include visual indicators indicating whether different elements satisfy criteria specified by rules or do not satisfy criteria specified by rules maintained by the digital magazine server 140. For example, if each element of a content item satisfies criteria specified by rules applied to a content item, the content item may be visually distinguished from content items having at least one element that does not satisfy criteria specified by at least one rule. In the example of FIG. 5, each element in content item 525D satisfies criteria of rules applied by the digital magazine server 140, so content item 525D is presented using a different color, layout, size, or other suitable alternative format than content items having at least one element that does not satisfy criteria of at least one rule applied by the digital magazine server 140. Presentation of a content item in the item window 515 may be modified as formatting information associated with an element of a content item is modified. Hence, if formatting information associated with elements in a content item that do not satisfy criteria in rules applied by the digital magazine server 140 is modified to satisfy the criteria in the rules, the presentation of the content item in the content item window 515 is modified to indicate that each element of the content item satisfies criteria specified by rules applied by the digital magazine server 140.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at a digital magazine server, a source address of a feed including a plurality of content items maintained by a source associated with the source address;
   retrieving the plurality of content items from the source using the source address;
   selecting one or more elements from each of plurality of retrieved content items, each element associated with formatting information describing presentation of an element to a user by the source;
   applying one or more rules to the selected one or more elements of the plurality of content items, each rule specifying criteria for presentation of one or more elements via the digital magazine server;
   generating results describing application of the one or more rules to the selected one or more elements, a result associated with the element indicating whether formatting information associated with the element satisfies criteria included in one or more rules;
   responsive to a result associated with the element indicating that formatting information associated with the element does not satisfy criteria included in the rule, generating one or more recommendations for modifying the element to satisfy the criteria included in the rule by including in the result an instruction that, when executed, modifies the formatting information associated with the element to satisfy the criteria included in the rule;
   presenting the results and recommendations to the source associated with the source address;
   receiving, at the digital magazine server, a selection of the instruction; and
   modifying the formatting information associated with the element to satisfy the criteria included in the rule based on the selection of the instruction.

2. The method of claim 1, further comprising:
   communicating the modified formatting information to the source.

3. The method of claim 1, wherein modifying the formatting information associated with the element to satisfy the criteria included in the rule based on the selection of the instruction comprises:
   communicating the instruction and an identifier associated with a content item including the element for execution by the source.

4. The method of claim 1, further comprising:
   responsive to determining a plurality of elements do not satisfy criteria for presentation of the plurality of elements via the digital magazine server specified by a rule, including in the results an instruction that, when executed, modifies the formatting information associated with the plurality of elements to satisfy criteria specified by the rule for presentation of the plurality of elements via the digital magazine server.

5. The method of claim 4, further comprising:
   receiving a selection of the instruction for modifying the formatting information associated with the plurality of elements from the user associated with the source;
   modifying formatting information describing presentation of each of the plurality of elements based on the instruction; and
   communicating the modified formatting information to the source.

6. The method of claim 4, further comprising:
   receiving a selection of the instruction for modifying the formatting information associated with the plurality of elements from the user associated with the source; and
   communicating the instruction and identifiers associated with each of the plurality of content items for execution by the source.

7. The method of claim 1, wherein the element is text data and a rule specifies criteria selected from a group consisting of: a font color, a font size, letter spacing, a placement of text relative at least one other element, a font, and any combination thereof.

8. The method of claim 1, wherein the element is image data and a rule specifies criteria selected from a group consisting of: a location of the image data relative to at least one other element, a resolution of the image data, one or more options for interacting with the image data, a size of the image data, and any combination thereof.

9. The method of claim 1, wherein the element is audio data and a rule specifies criteria selected from a group consisting of: a volume with which the audio data is presented, one or more conditions for playing the audio data, and any combination thereof.

10. The method of claim 1, further comprising:
generating groups of results, each group associated with a specific rule and including results of application of the specific rule to one or more elements; and
presenting the groups of results to the source associated with the source address.

11. The method of claim 1, wherein the generated results include a preview of presentation of a content item using recommended modifications to one or more elements of the content item.

12. A method comprising:
receiving, at a digital magazine server, a source address of a feed including a plurality of content items maintained by a source associated with the source address;
retrieving a content item from the source using the source address;
selecting one or more elements the content item, each element associated with formatting information describing presentation of an element to a user by the source;
applying one or more rules to the selected one or more elements of the content item, each rule specifying criteria for presentation of one or more elements via the digital magazine server;
generating results describing application of the one or more rules to the selected one or more elements, a result associated with the element indicating whether formatting information associated with the element satisfies criteria included in one or more rules;
responsive to a result associated with the element indicating that formatting information associated with the element does not satisfy criteria included in the rule, generating one or more recommendations for modifying the element to satisfy the criteria included in the rule by including in the result an instruction that, when executed, modifies the formatting information associated with element to satisfy the criteria specified by the rule;
presenting the results and recommendations to the source associated with the source address;
receiving, at the digital magazine server, a selection of the instruction; and
modifying the formatting information associated with the element to satisfy the criteria included in the rule based on the selection of the instruction.

13. The method of claim 12, further comprising:
communicating the modified formatting information to the source.

14. The method of claim 12, wherein modifying the formatting information associated with the element to satisfy the criteria included in the rule based on the selection of the instruction comprises:
communicating the instruction and an identifier associated with the content item to the source.

15. The method of claim 12, wherein generating the one or more recommendations for modifying the element to satisfy the criteria included in the rule comprises:
including in the results an instruction that, when executed, modifies formatting information associated with one or more additional content items including the element to satisfy criteria specified by the rule for presentation of the element via the digital magazine server.

16. The method of claim 12, wherein the element is text data and a rule specifies criteria selected from a group consisting of: a font color, a font size, letter spacing, a placement of text relative at least one other element, a font, and any combination thereof.

17. The method of claim 12, wherein the element is image data and a rule specifies criteria selected from a group consisting of: a location of the image data relative to at least one other element, a resolution of the image data, one or more options for interacting with the image data, a size of the image data, and any combination thereof.

18. The method of claim 12, wherein the element is audio data and a rule specifies criteria selected from a group consisting of: a volume with which the audio data is presented, one or more conditions for playing the audio data, and any combination thereof.

19. The method of claim 12, wherein the generated results include a preview of presentation of the content item using recommended modifications to the selected one or more elements of the content item.

20. A computer program product comprising a non-transitory computer-readable storage medium having instructions encoded thereon that, when executed by a processor, cause the processor to:
receive, at a digital magazine server, a source address of a feed including a plurality of content items maintained by a source associated with the source address;
retrieve the plurality of content items from the source using the source address;
select one or more elements from each of plurality of retrieved content items, each element associated with formatting information describing presentation of an element to a user by the source;
apply one or more rules to the selected one or more elements of the plurality of content items, each rule specifying criteria for presentation of one or more elements via the digital magazine server;
generate results describing application of the one or more rules to the selected one or more elements, a result associated with the element indicating whether formatting information associated with the element satisfies criteria included in one or more rules;
responsive to a result associated with the element indicating that formatting information associated with the element does not satisfy criteria included in the rule, generate one or more recommendations for modifying the element to satisfy the criteria included in the rule by including in the result an instruction that, when executed, modifies the formatting information associated with the element to satisfy the criteria specified by the rule; and
present the results and recommendations to the source associated with the source address;
receiving, at the digital magazine server, a selection of the instruction; and
modifying the formatting information associated with the element to satisfy the criteria included in the rule based on the selection of the instruction.

21. The computer program product of claim 20, further comprising instructions that, when executed by a processor, cause the processor to:
responsive to determining a plurality of elements do not satisfy criteria for presentation of the plurality of elements via the digital magazine server specified by a rule, include in the results an instruction that, when executed, modifies the formatting information associated with the plurality of elements to satisfy criteria specified by the rule for presentation of the plurality of elements via the digital magazine server.

\* \* \* \* \*